US011256374B2

(12) United States Patent
Lundy et al.

(10) Patent No.: US 11,256,374 B2
(45) Date of Patent: Feb. 22, 2022

(54) CAPACITIVE TOUCH BAR WITH TACTILE SWITCH FOR A REARVIEW DEVICE (71) Applicant: Gentex Corporation, Zeeland, MI (US)

(72) Inventors: Eric S. Lundy, Grand Rapids, MI (US); Joseph P. Brigham, Saugatuck, MI (US); Danny L. Minikey, Jr., Fenwick, MI (US); Mark R. Roth, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/571,915

(22) Filed: Sep. 16, 2019

(65) Prior Publication Data
US 2020/0097107 A1 Mar. 26, 2020

Related U.S. Application Data (60) Provisional application No. 62/736,703, filed on Sep. 26, 2018.

(51) Int. Cl.
G06F 3/044 (2006.01)
B60R 1/12 (2006.01)
G06F 3/01 (2006.01)
B60R 1/04 (2006.01)

(52) U.S. Cl.
CPC ................ G06F 3/044 (2013.01); B60R 1/12 (2013.01); G06F 3/016 (2013.01); B60R 1/04 (2013.01); B60R 2001/1215 (2013.01)

(58) Field of Classification Search
CPC . G06F 3/044; G06F 3/016; B60R 1/12; B60R 2001/1215; B60R 1/04
See application file for complete search history.

(56) References Cited

U.S. PATENT DOCUMENTS

| 5,873,597 | A | | 2/1999 | Sim |
| 5,940,503 | A | * | 8/1999 | Palett ........................ B60R 1/12 379/446 |
| 8,614,845 | B2 | | 12/2013 | Tonar et al. |
| 9,067,542 | B2 | * | 6/2015 | Lindahl ............... G06F 3/04842 |
| 9,134,585 | B2 | | 9/2015 | Tonar et al. |
| 2002/0003571 | A1 | | 1/2002 | Schofield et al. |

(Continued)

FOREIGN PATENT DOCUMENTS

KR 1020170017577 A 2/2017
RU 150950 U1 3/2015

Primary Examiner — David D Davis
(74) Attorney, Agent, or Firm — Price Heneveld LLP; Brian James Brewer (57) ABSTRACT A rearview assembly includes a housing and a display assembly that is operably coupled with the housing. An actuation assembly is adjacent the housing and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. A conductive contact assembly is operably coupled with the housing and configured to send a signal to a processor to activate a function of the rearview assembly.

19 Claims, 7 Drawing Sheets (56) References Cited

U.S. PATENT DOCUMENTS

| | | | |
|---|---|---|---|
| 2005/0169003 A1* | 8/2005 | Lindahl | G06F 3/0488 |
| | | | 362/494 |
| 2006/0255960 A1* | 11/2006 | Uken | G02F 1/157 |
| | | | 340/815.4 |
| 2010/0091394 A1 | 4/2010 | DeWind et al. | |
| 2012/0312676 A1 | 12/2012 | Salter et al. | |
| 2014/0124350 A1 | 5/2014 | Siebert et al. | |
| 2016/0062513 A1 | 3/2016 | Turnbull | |

* cited by examiner

CAPACITIVE TOUCH BAR WITH TACTILE SWITCH FOR A REARVIEW DEVICE

CROSS-REFERENCE TO RELATED APPLICATION

This application claims priority to and the benefit under 35 U.S.C. § 119(e) of U.S. Provisional Application No. 62/736,703, filed on Sep. 26, 2019, entitled "CAP TOUCH BAR WITH TACT SWITCH," the disclosure of which is hereby incorporated herein by reference in its entirety.

FIELD OF THE DISCLOSURE

The present disclosure generally relates to a button assembly for a rearview assembly, and more particularly to a button assembly including a capacitive touch bar that works in conjunction with a tactile switch.

SUMMARY OF THE DISCLOSURE

According to one aspect of the present disclosure, a rearview assembly includes a housing and a display assembly that is operably coupled with the housing. An actuation assembly is adjacent the housing and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. A conductive contact assembly is operably coupled with the housing and configured to send a signal to a processor to activate a function of the rearview assembly.

According to another aspect of the present disclosure, a rearview assembly includes a display assembly and an actuation assembly that is adjacent to the display assembly and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. At least one conductive member is disposed on the single button and is configured to relay a signal to at least one contact member that is operably coupled with a circuit board, which activates a feature selected by the user.

According to yet another aspect of the present disclosure, a rearview assembly includes a housing and a display assembly that is operably coupled with the housing. An actuation assembly is positioned adjacent the housing and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. A conductive contact assembly is operably coupled with the housing and is configured to selectively activate a feature selected by the user. A plurality of guides provide for a smooth and uniform actuation of the single button.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a button assembly for a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
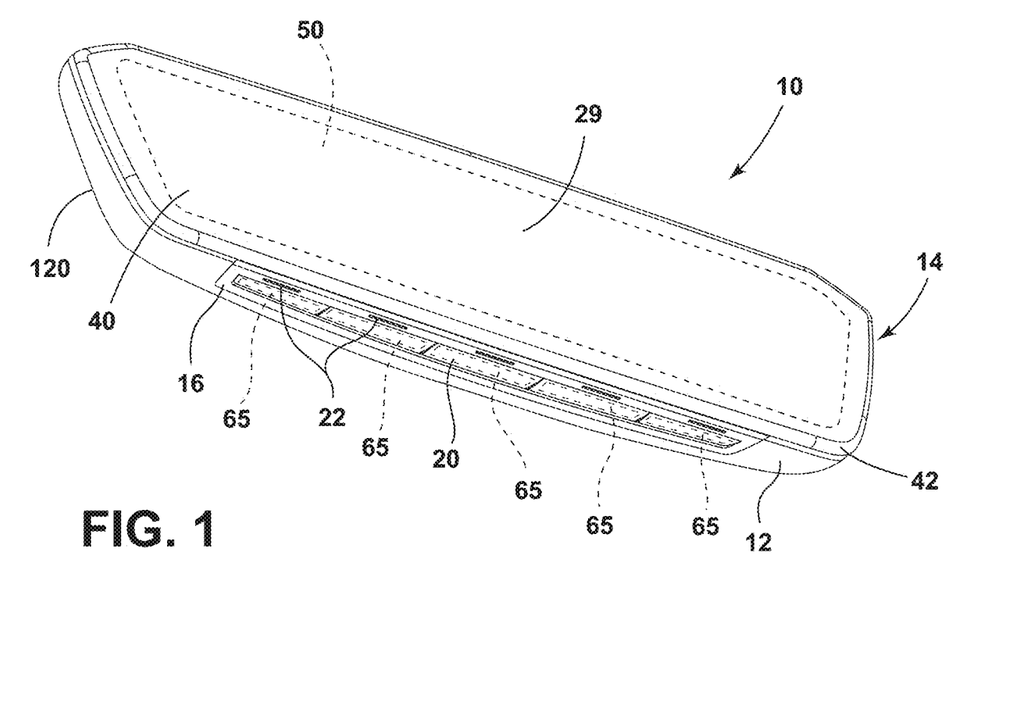
FIG. 1 is a bottom perspective view of a rearview assembly including a cap touch bar with a tact switch of the present disclosure.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-6, reference numeral 10 generally designates a rearview assembly that includes a housing 12, a display assembly 14 that is operably coupled with the housing 12, and an actuation assembly 16. The actuation assembly 16 is adjacent to the housing 12 and is configured to activate a plurality of features of the rearview assembly 10. The actuation assembly 16 includes a single button 20 that is operable between engaged and disengaged positions. A plurality of tactile indicia 22 are spaced along the single button 20 and are configured to indicate a particular function of the rearview assembly 10. A proximity sensor assembly 24 is disposed on the single button 20 and is configured to sense proximity of a user. The actuation assembly 16 also includes a conductive contact assembly 28 (FIG. 5A) that is operably coupled with the housing 12 and configured to send a signal to a processor 30 to activate a function of the rearview assembly 10.

With reference again to FIG. 1, the rearview assembly 10 is generally configured for use inside a vehicle. The rearview assembly 10 may be operably coupled with a headliner or windscreen of the vehicle and adjusted to suit the needs of a driver. The rearview assembly 10 is configured to provide a rear view behind the vehicle to a seated driver. The housing 12 of the rearview assembly 10 is operably coupled with the display assembly 14. The display assembly 14 defines a display area 29 that may provide an image of a rear portion of a vehicle by reflection or by a display screen (LED, OLED, LCD, etc.). The display assembly 14 may include a prismatic mirror assembly or may include an electro-optic assembly 40, as shown in FIGS. 1-2B.

The electro-optic assembly 40 may be an electrochromic device, or other dimming device that is designed to darken, thereby minimizing glare during particular driving conditions. As shown, the electro-optic assembly 40 includes a peripheral edge 42 that may be a grounded edge or a rounded edge. Alternatively, the electro-optic assembly 40 may include a bezel configured to conceal and protect the peripheral edge 42 of the electro-optic assembly 40 such as that described in U.S. Pat. No. 10,131,279, the contents of which are incorporated herein by reference in their entirety. In addition, it will be understood that the electro-optic assembly 40 may include first and second substrates 44, 46 with an electro-optic medium disposed therebetween. The first substrate 44 generally defines a first surface and a second surface. The second substrate 46 generally defines a third surface and a fourth surface. The electro-optic medium is disposed between the second surface and the third surface. In addition, the third surface or the fourth surface may include a reflective layer configured to reflect an image from an area behind the vehicle.

The display assembly 14 may also include a display 50 which may provide information to the user. The display 50 may be a full display mirror assembly (that extends across substantially all of the display area 29 such as those set forth in U.S. Pat. Nos. 8,879,139, 9,057,875, 9,505,349, 9,575, 315, 10,018,843, and 10,071,689 and in U.S. patent application Ser. No. 16/030,633, now U.S. Pat. No. 10,739,591, which are incorporated herein by reference in their entirety. It is contemplated that the display 50 may be automatically activated or may be activated manually by selection of a predetermined tactile indicia 22 and actuation of the single button 20. Alternatively, the display 50 may extend across only a small part of the display area 29. The display 50 may display or show image data that is gathered by an imager disposed inside or about an exterior periphery of the vehicle. Alternatively, the display 50 may provide other information including vehicle location, temperature, etc. which can be displayed to the driver when in use. The display 50 is disposed behind the electro-optic assembly 40 and can be seen therethrough. More specifically, the display 50 may be configured to provide images or video to a user by transmitting the images or video through both the first and second substrates 44, 46 of the electro-optic assembly 40 of the rearview assembly 10. A circuit board 54 may be operably coupled with the display assembly 14, which may include either or both of the display 50 and the electro-optic assembly 40, and is also operably coupled with the actuation assembly 16. The circuit board 54 is generally illustrated as positioned behind both the display 50 and the electro-optic assembly 40, however, the circuit board 54 could also extend above or below the display 50 and the electro-optic assembly 40 and could include a planar extent that is orthogonal to the display 50 and the electro-optic assembly 40. The actuation assembly 16 is disposed on a bottom surface of the housing 12, however, the actuation assembly 16 could be positioned anywhere about the housing 12. Further, any number of distinct indicia of the plurality of tactile indicia 22 that designate different functions of the rearview assembly 10 may be provided. Moreover, it is generally contemplated that each of the tactile indicia 22 may be distinct from one another. Stated differently, each of the tactile indicia 22 may feel different to the user. For example, a first tactile indicia 22 may include one long ridge, a second tactile indicia 22 may include a two adjacent ridges, a third tactile indicia 22 may include three short bumps, etc. In addition, it is generally contemplated that the sensory feedback may be provided to the user upon selection of a particular tactile indicia 22 after pressing the single button 20. More specifically, a confirmatory feedback device may be disposed adjacent to, or within, the housing 12, which is configured to notify the user that a particular function of the rearview assembly 10 has been activated. The confirmatory feedback device may include auditory, tactile, or visual confirmation of activation. For example, auditory feedback in the form of a beep or buzz may come from a horn or bell to notify the user that the selection has been received. Alternatively, tactile feedback, such as a vibration or click at the selected indicia 22, may come from a vibration plate on the single button 20 to notify the user that the selection has been received. In yet another instance, a visual cue may be provided to the user upon selection of a particular indicia 22 and pressing the single button 20. For example, a light may be activated on the housing 12, behind the electro-optic assembly 40, or on the display 50.

Figure 2A:
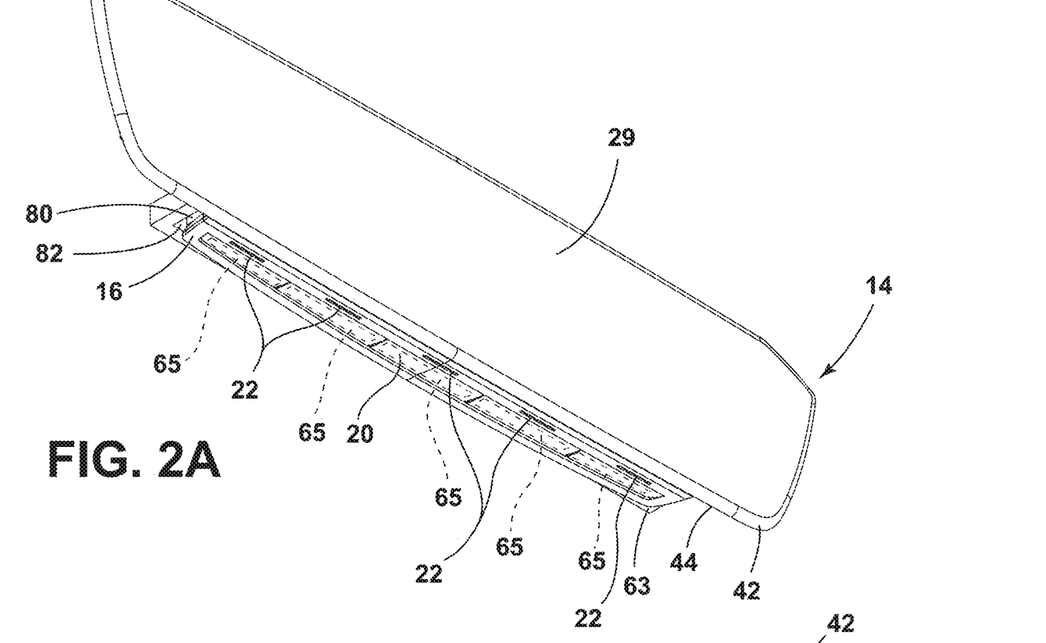
FIG. 2A is a front perspective view of an electro-optic assembly and button assembly of the present disclosure.
Figure 2B:
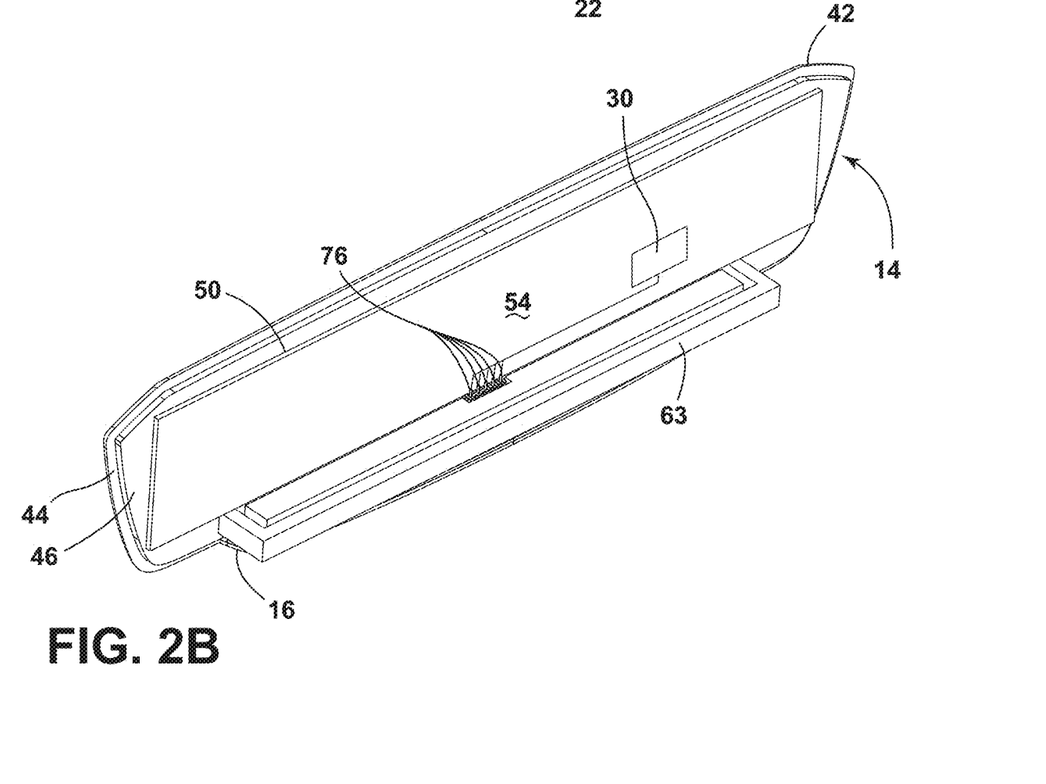
FIG. 2B is a rear perspective view of an electro-optic assembly and button assembly of the present disclosure.

With reference now to FIGS. 1, 2A, and 2B, the actuation assembly 16 includes the single button 20 that extends across the bottom side of the housing 12. The single button 20 includes a tact switch 60 (FIG. 6) that is disposed on an inside surface 62 of the single button 20, between the single button 20 and a lateral support 63. The tact switch 60 is operable between an engaged position, where the switch is closed, and a disengaged position, where the switch is open. Although only one tact switch 60 is illustrated, it is generally contemplated that multiple tact switches 60 may extend across the single button 20. It is also contemplated that the tact switch 60 may be positioned anywhere along the single button 20, but is shown in a central location in FIG. 6. When the user presses on the single button 20 anywhere along the single button 20, the tact switch 60 is engaged, thereby activating a feature of the rearview assembly 10. The proximity sensor assembly 24, that is disposed on the single button 20, may include a single proximity sensor 65 that is configured to measure a change in an electromagnetic field proximate the single proximity sensor 65. Moreover, the single proximity sensor 65 may be calibrated such that the change in the electromagnetic field is measured to determine where a user contacted the single button 20. For example, the single proximity sensor 65 may detect that a user contacted the left side indicia, prior to depressing the single button 20. This may result in a particular function of the rearview assembly 10 being carried out. In another instance, the single proximity sensor 65 may detect that the user contacted the single button 20 proximate the centrally located indicia 22. This may result in another function of the rearview device being carried out.

It is also contemplated that each indicia 22 may be proximate a separate and distinct proximity sensor 65. In this instance, when a particular proximity sensor 65 detects a finger (for example) of the user and the user presses the single button 20, a particular function of the rearview assembly 10 is activated. When a different proximity sensor 65, adjacent to a different indicia 22 is selected, and the single button 20 is depressed, a different function is activated. It is also generally contemplated that there could be one proximity sensor 65 in the form of a capacitive switch that extends across a length of the single button 20. However, other sensing devices for use with the proximity sensor assembly 24 are also contemplated, such as an inductive sensor, a photoelectric sensor, a diffuse sensor, etc. Regardless, the proximity sensor or sensors 65 of this disclosure are configured to detect the presence, for example, of the finger of the user, by proximity or contact, and the relative position of the finger on the single button 20 prior to the single button 20 being depressed. In use, the user can select a position on the single button 20 using the plurality of tactile indicia 22 that may be disposed on the single button 20 to select a particular location on the single button 20 which activates a particular feature of the rearview assembly 10, known to the user. Once the finger of the user has been detected by the proximity sensor or sensors 65, the location of the finger of the user has been determined, and the tact switch 60 has been depressed by application of force of the finger to the single button 20, a particular feature may be activated by the rearview assembly 10.

Figure 3:
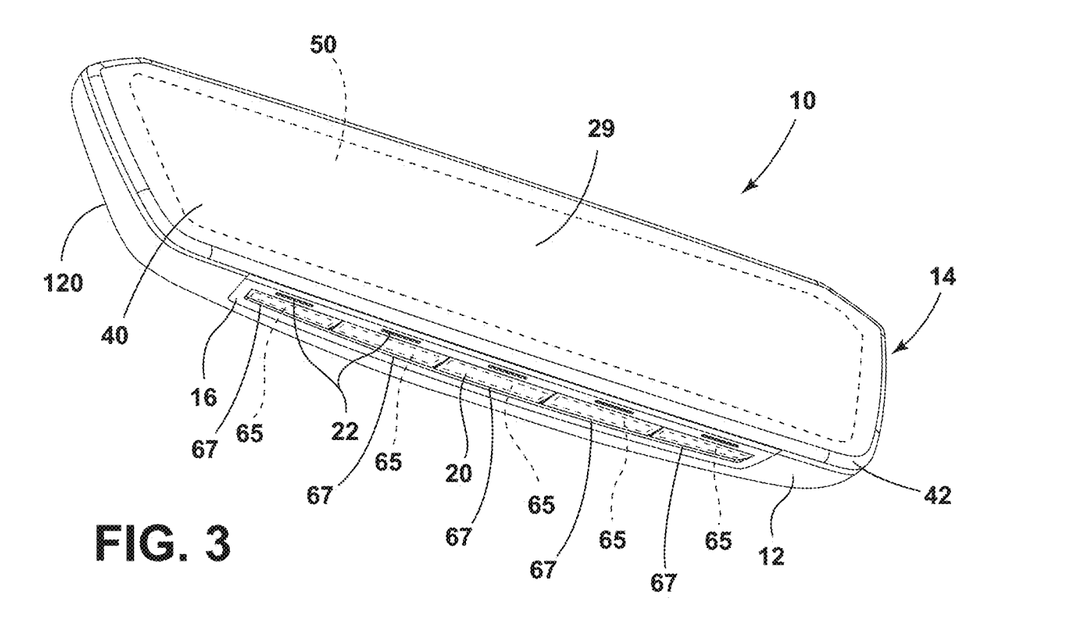
FIG. 3 is a bottom perspective view of a rearview assembly including a cap touch bar with a tact switch, according to an alternate construction.
Figure 4:
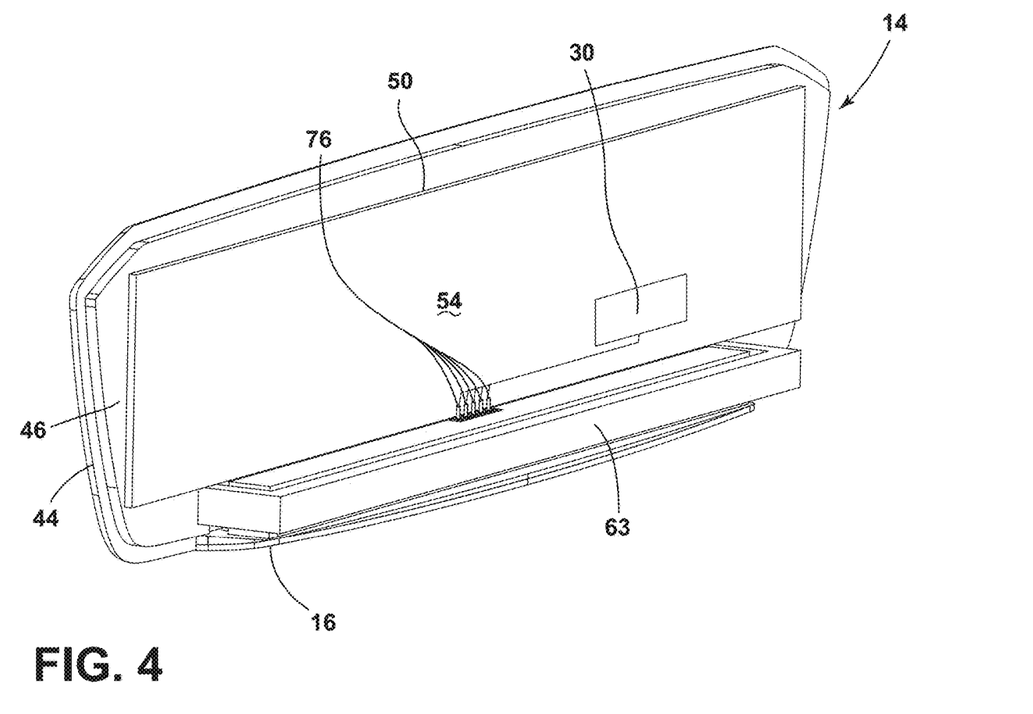
FIG. 4 is a rear perspective view of an electro-optic assembly and button assembly of the present disclosure.

With reference now to FIG. 3, it is also contemplated that the proximity sensor assembly 24 may utilize the proximity sensor or sensors 65 to determine when the user is about to contact one of the plurality of indicia 22. When the proximity sensor 65 detects the finger of the user approaching any of the plurality of indicia 22, the processor 30 may activate a secondary sensor 67 (such as, for example, a capacitive touch sensor) adjacent to each of the plurality of indicia 22. When the user contacts a particular one of the plurality of indicia 22, the adjacent secondary sensor 67 detects the finger of the user and sends a signal to the processor 30, which indicates which particular feature or function of the rearview assembly 10 should be activated. This configuration may result in a power savings as the secondary sensors 67 are not activated until the proximity sensor or sensors 65 detect the presence of the user.

Figure 5:
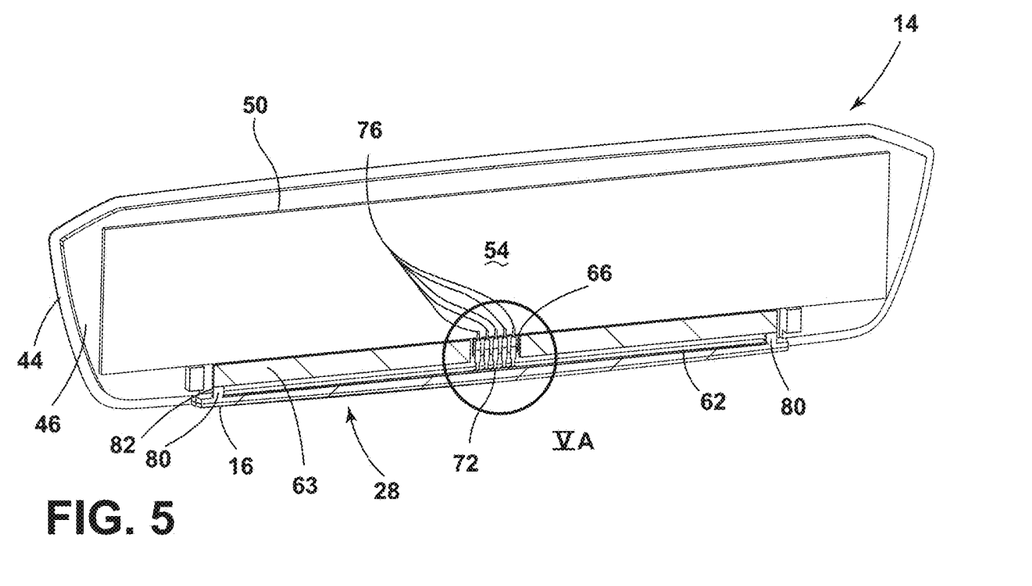
FIG. 5 is a partial top perspective cross-section view of an electro-optic assembly and button assembly of the present disclosure.
Figure 5A:
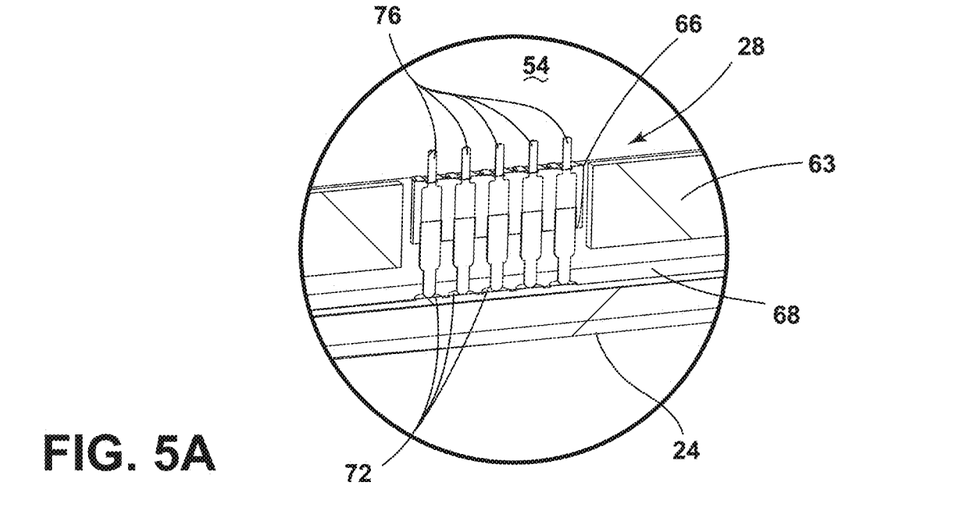
FIG. 5A is an enlarged view of a conductive contact assembly taken at area VA of FIG. 5.

With reference to FIGS. 5 and 5A, the conductive contact assembly 28 of the rearview assembly 10 is illustrated. The conductive contact assembly 28 may include at least one contact member, such as a pin connector 66. During installation, it will be understood that the pin connector 66 of the conductive contact assembly 28 may be used to relay signals from a button switch board 68 of the single button 20 to the circuit board 54 in the housing 12. For example, the pin connector 66 on the single button 20 may include at least one or more conductive members in the form of contacts or pin pads 72 disposed on an inside surface 62 of the single button 20. In one example, it is contemplated that each of the plurality of contacts or pin pads 72 may be associated with a particular proximity sensor 65. The plurality of contacts or pin pads 72 are configured to engage spring-loaded pins 76 that extend downwardly from the circuit board 54. When a particular proximity sensor 65 detects the user, a signal is sent to the related contact or pin pad 72, which transfers the signal through the related spring-loaded pin 76 to wiring that relays the signal to a secondary circuit board or the processor 30 to activate a particular function. The functions that may be activated by selection of the single button 20 may include, but are not limited to, a microphone, a rear camera display, a full display mirror, a video device or camera disposed inside or outside the vehicle, a security system, a Global Positioning System (GPS), a motion sensor, a rain sensor, a seat occupancy detection sensor, an interior light, an electronic automatic tolling system, a compass, an engine status indicator, a temperature display or temperature sensor, a tire pressure display, or any other device useful to the user.

The spring-loaded pins 76 are supported by the lateral support 63 that extends outwardly orthogonal relative to the display assembly 14. It will be understood that the spring-loaded pins 76 may be operably coupled with the lateral support 63 and may relay information to a circuit board located elsewhere in the housing 12 of the rearview assembly 10. In addition, the use of the pin connector 66 eliminates the need for a wire harness or other data/power connection. Accordingly, manufacturing is easier and the likelihood of faulty wiring or damage is minimized.

Figure 6:
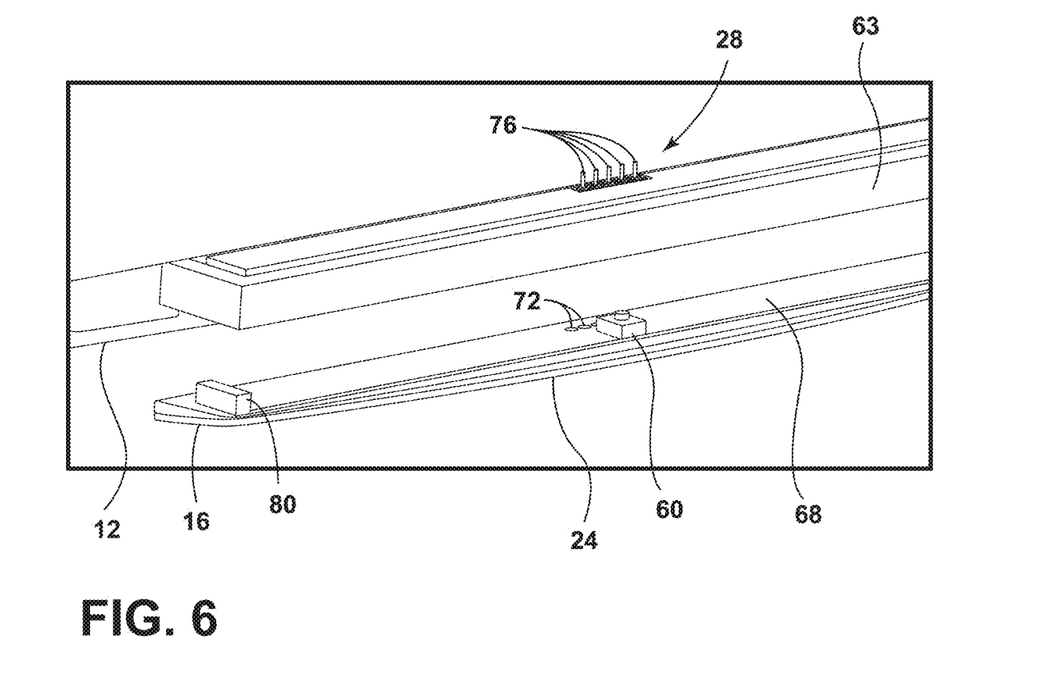
FIG. 6 is a partial bottom perspective view of a button assembly prior to connection with a housing of a rearview assembly of the present disclosure.

With reference to FIGS. 5-6, the single button 20 also includes guides 80 disposed at each of two opposing sides of the single button 20. The guides 80 are configured to allow for smooth movement of the single button 20 between the engaged and disengaged positions. The guides 80 extend from each side of the single button 20 and into the housing 12. It is generally contemplated that the guides 80 may be disposed of a polymer material, including elastic, nylon, etc., that provides minimal friction against an inside guiding surface 82 disposed in the housing 12. As a result, the single button 20 can be engaged and disengaged many times over the course of several years without concern of failure.

Figure 7:
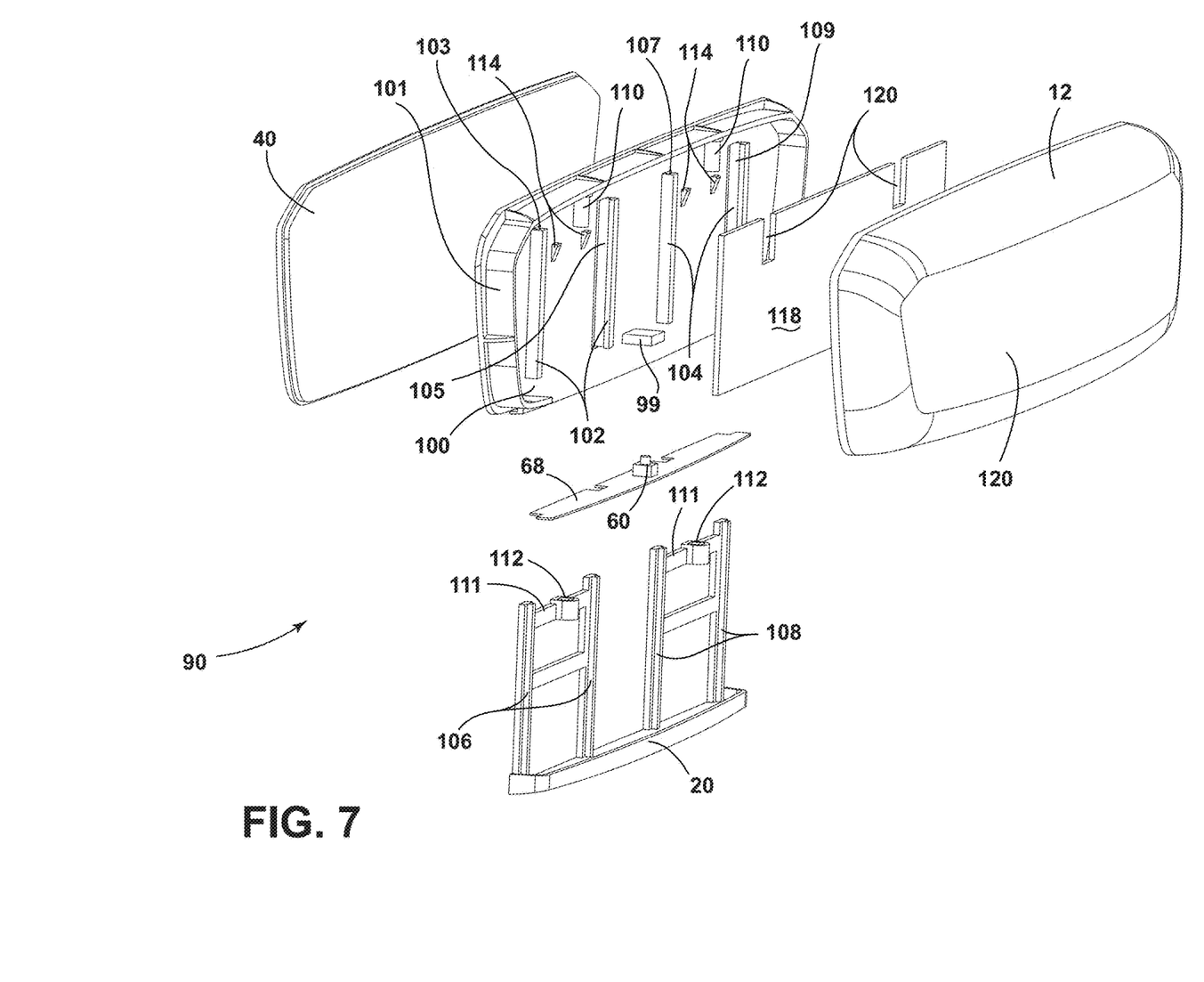
FIG. 7 is a top perspective exploded view of a rearview assembly of the present disclosure.
Figure 8:
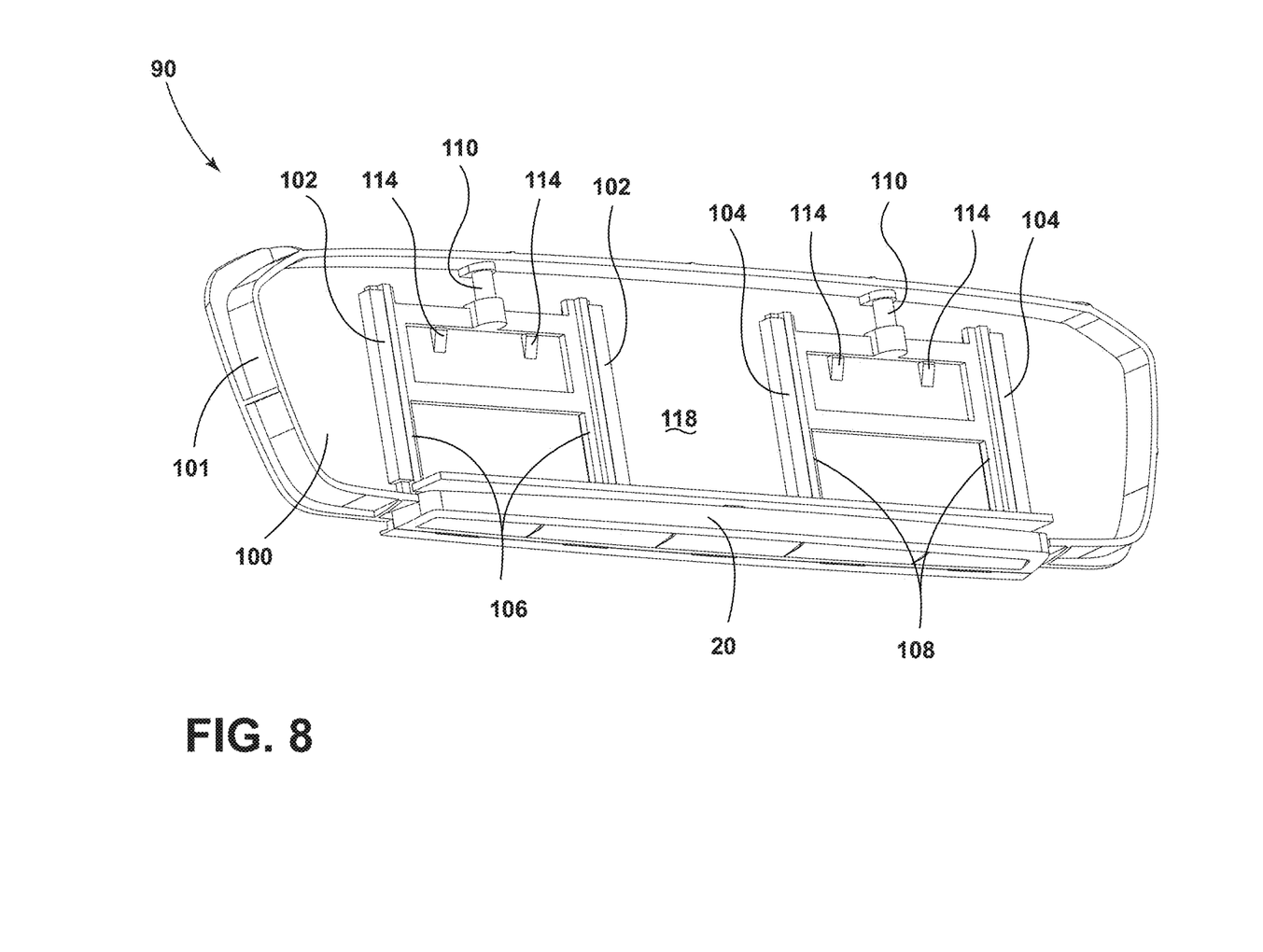
FIG. 8 is a rear perspective view of a display assembly of the present disclosure.

With reference now to FIGS. 7 and 8, an alternate construction for an actuation assembly 90 is shown. The electro-optic assembly 40 is operably coupled with a carrier 100. The carrier 100 is configured to support the electro-optic assembly 40 and is operably coupled with an interior portion of the housing 12. The carrier 100 includes a peripheral wall 101 and an engagement member 99. The carrier 100 also includes first and second rail set receivers 102, 104 configured to receive rail sets 106, 108, respectively, that extend from the single button 20. Specifically, the first rail set receiver 102 defines channels 103, 105 that receive the rail set 106. Similarly, the second rail set receiver 104 defines channels 107, 109 that receive the rail set 108. The rail sets 106, 108 are in contact with, or approximate to, a spring assembly that includes compression springs 110 that extend between the peripheral wall 101 of the carrier 100 and a spring pad 112 that is positioned on each rail set 106, 108. Detents 114 are disposed approximate each compression spring 110 and are configured to abut a cross-member 111 on each of the rail sets 106, 108 to maintain each of the rail sets 106, 108 in position. A circuit board 118 is disposed between a rear wall 120 of the housing 12 and the rail sets 106, 108. The circuit board 118 may include slots 120 configured to receive the compression springs 110.

In use, the user may select a position on the single button 20, which is detected by the proximity sensor assembly 24. The user may apply pressure to the single button 20 against the force of the compression springs 110. The tact switch 60 is engaged after displacement of the single button 20 a predetermined distance such that the engagement member 99 actuates the tact switch 60. A selected function of the rearview assembly 10 is now activated. As the user removes the force from the single button 20, the compression springs 110 push the spring pad 112, and consequently, the rail sets 106, 108, and the single button 20 back to a starting, or disengaged, position.

According to one aspect of the present disclosure, a rearview assembly includes a housing and a display assembly that is operably coupled with the housing. An actuation assembly is adjacent the housing and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. A conductive contact assembly is operably coupled with the housing and configured to send a signal to a processor to activate a function of the rearview assembly.

According to another aspect of the present disclosure, a proximity sensor assembly includes a proximity sensor that is disposed adjacent to each of a plurality of tactile indicia.

According to yet another aspect of the present disclosure, a single button includes a single switch disposed between a button switch board and a lateral support of a housing.

According to another aspect of the present disclosure, a button switch board includes a plurality of pin pads configured to abut spring-loaded pins disposed in a lateral support of a housing.

According to still yet another aspect of the present disclosure, an actuation assembly extends across a bottom surface of a housing.

According to even another aspect of the present disclosure, guides extend from each side of a single button into a housing to provide smooth movement of the single button between engaged and disengaged positions.

According to an additional aspect of the present disclosure, each of a plurality of tactile indicia is distinct from one another.

According to another aspect of the present disclosure, a confirmatory feedback device is configured to notify a user that a particular function of a rearview assembly has been activated.

According to yet another aspect of the present disclosure, a single button is operably coupled with rails that extend between a display assembly and a rear wall of a housing.

According to still another aspect of the present disclosure, a carrier supports a display assembly, and also supports guides that receive rails.

According to another aspect of the present disclosure, a carrier includes detents that are configured to abut a cross-member of rails. The carrier further includes a spring assembly that is configured to bias a single button away from a housing.

According to still another aspect of the present disclosure, a circuit board is operably coupled with a carrier and includes slots that are configured to accommodate a spring assembly According to yet another aspect of the present disclosure, a rearview assembly includes a display assembly and an actuation assembly that is adjacent to the display assembly and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. At least one conductive member is disposed on the single button and is configured to relay a signal to at least one contact member that is operably coupled with a circuit board, which activates a feature selected by the user.

According to still another aspect of the present disclosure, a rearview assembly includes a housing and a display assembly that is operably coupled with the housing. An actuation assembly is positioned adjacent the housing and is configured to activate a plurality of features of the rearview assembly. The actuation assembly includes a single button that is operable between engaged and disengaged positions. A plurality of tactile indicia are spaced along the single button and are configured to indicate a particular function of the rearview assembly. A proximity sensor assembly is disposed on the single button and is configured to sense proximity of a user. A conductive contact assembly is operably coupled with the housing and is configured to selectively activate a feature selected by the user. A plurality of guides provide for a smooth and uniform actuation of the single button.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A rearview assembly comprising:
   a housing;
   a display assembly operably coupled with the housing;
   an actuation assembly adjacent the housing and configured to activate a plurality of features of said rearview assembly, the actuation assembly comprising:
      a single button operable between engaged and disengaged positions;
      a plurality of tactile indicia spaced along the single button, each of the plurality of tactile indicia indicating a particular function of said rearview assembly;
      a proximity sensor configured to sense multiple locations along the single button selectively engaged by a user, wherein each of the multiple locations is proximate one of the plurality of tactile indicia; and
      a conductive contact assembly operably coupled with the housing and configured to send a signal to a processor to activate the particular function of said rearview assembly.

2. The rearview assembly of claim 1, wherein the single button includes a single switch disposed between a button switch board and a lateral support of the housing.

3. The rearview assembly of claim 2, wherein the button switch board includes a plurality of pin pads configured to abut spring-loaded pins disposed in the lateral support.

4. The rearview assembly of claim 1, wherein the actuation assembly extends across a bottom surface of the housing.

5. The rearview assembly of claim 1, further comprising:
   guides that extend from each side of the single button into the housing to provide smooth movement of the single button between the engaged and disengaged positions.

6. The rearview assembly of claim 1, wherein each of the plurality of tactile indicia are distinct from one another.

7. The rearview assembly of claim 1, further comprising:
   a confirmatory feedback device configured to notify the user that a particular function of said rearview assembly has been activated.

8. The rearview assembly of claim 1, wherein the single button is operably coupled with rails that extend between the display assembly and a rear wall of the housing.

9. The rearview assembly of claim 8, further comprising:
   a carrier that supports the display assembly, and which supports guides that receive the rails.

10. The rearview assembly of claim 9, wherein the carrier includes detents configured to abut a cross-member of the rails, and further includes a spring assembly configured to bias the single button away from the housing.

11. The rearview assembly of claim 10, further comprising:
    a circuit board operably coupled with the carrier, the circuit board including slots configured to accommodate the spring assembly.

12. A rearview assembly comprising:
    a display assembly;
    an actuation assembly adjacent the display assembly and configured to activate a plurality of features of said rearview assembly, the actuation assembly comprising:
       a single button operable between engaged and disengaged positions;
       a plurality of tactile indicia spaced along the single button, each of the plurality of tactile indicia configured to indicate a particular function of said rearview assembly;
       a proximity sensor disposed proximate each of the plurality of tactile indicia along the single button; and
       at least one conductive member disposed on the single button and configured to relay a signal to at least one contact member operably coupled with a circuit board when the single button is in the engaged position and the proximity sensor disposed at one of the plurality of tactile indicia has been selected by a user.

13. The rearview assembly of claim 12, further comprising:
    a confirmatory feedback device configured to notify the user that a particular function of said rearview assembly has been activated.

14. The rearview assembly of claim 12, wherein the single button includes a single switch disposed between a button switch board and a lateral support of the housing.

15. The rearview assembly of claim 14, wherein the button switch board includes a plurality of pin pads configured to abut spring-loaded pins disposed in the lateral support.

16. A rearview assembly comprising:
    a housing;
    a display assembly operably coupled with the housing;
    an actuation assembly adjacent the housing and configured to activate a plurality of features of said rearview assembly, the actuation assembly comprising:
       a single button operable between engaged and disengaged positions;
       a plurality of tactile indicia spaced along the single button, each of the plurality of tactile indicia configured to indicate a particular function of said rearview assembly;
       a proximity sensor disposed adjacent to each one of the plurality of tactile indicia along the single button, each proximity sensor configured to sense proximity of a user;
       a conductive contact assembly operably coupled with the housing and configured to selectively activate the particular function selected by the user and associated with one of the plurality of tactile indicia; and
       a plurality of guides that provide for a smooth and uniform actuation of the single button.

17. The rearview assembly of claim 16, further comprising:

a carrier that supports the display assembly, and which supports the plurality of guides that receive a plurality of rails.

18. The rearview assembly of claim 17, wherein the carrier includes detents configured to abut a cross-member of the plurality of rails, and further includes a spring assembly configured to bias the single button away from the housing.

19. The rearview assembly of claim 18, further comprising:
a circuit board operably coupled with the carrier, the circuit board including slots configured to accommodate the spring assembly.

* * * * *